(12) United States Patent
Vakkalanka

(10) Patent No.: US 7,917,591 B2
(45) Date of Patent: Mar. 29, 2011

(54) SYSTEM AND METHOD FOR STREAMING VIDEOS INLINE WITH AN E-MAIL

(75) Inventor: Surya Vakkalanka, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 286 days.

(21) Appl. No.: 11/828,218

(22) Filed: Jul. 25, 2007

(65) Prior Publication Data

US 2009/0030991 A1 Jan. 29, 2009

(51) Int. Cl.
*G06F 15/16* (2006.01)
*G06F 3/00* (2006.01)
*H04N 7/173* (2006.01)

(52) U.S. Cl. ........ 709/206; 709/204; 709/230; 709/231; 725/51; 725/112; 725/113

(58) Field of Classification Search .......... 709/204–206, 709/207, 230–231; 725/87, 112–113, 135, 725/51, 61; 715/700, 719, 738, 744, 748, 715/752, 838
See application file for complete search history.

(56) References Cited

U.S. PATENT DOCUMENTS

| | | | |
|---|---|---|---|
| 6,795,863 B1 * | 9/2004 | Doty, Jr. | 709/231 |
| 6,965,926 B1 * | 11/2005 | Shapiro et al. | 709/219 |
| 7,293,275 B1 | 11/2007 | Krieger et al. | |
| 2001/0052019 A1 * | 12/2001 | Walters et al. | 709/231 |
| 2002/0056123 A1 * | 5/2002 | Liwerant et al. | 725/87 |
| 2002/0180788 A1 * | 12/2002 | Wu | 345/752 |
| 2003/0088687 A1 * | 5/2003 | Begeja et al. | 709/231 |
| 2003/0122922 A1 * | 7/2003 | Saffer et al. | 348/14.01 |
| 2003/0149802 A1 * | 8/2003 | Curry et al. | 709/329 |
| 2003/0163819 A1 * | 8/2003 | Lee et al. | 725/61 |
| 2005/0033855 A1 | 2/2005 | Moradi et al. | |
| 2006/0212531 A1 | 9/2006 | Kikkawa et al. | |
| 2006/0242664 A1 | 10/2006 | Kikkawa et al. | |
| 2007/0058647 A1 * | 3/2007 | Bettis et al. | 370/401 |
| 2007/0094333 A1 * | 4/2007 | Schilling et al. | 709/206 |
| 2007/0244977 A1 * | 10/2007 | Atkins | 709/206 |
| 2007/0288574 A1 * | 12/2007 | Koster et al. | 709/206 |
| 2008/0120328 A1 * | 5/2008 | Delgo et al. | 707/102 |
| 2008/0168503 A1 | 7/2008 | Sparrell | |
| 2008/0209480 A1 * | 8/2008 | Eide et al. | 725/87 |
| 2009/0086937 A1 * | 4/2009 | Horn et al. | 379/88.13 |
| 2009/0094646 A1 | 4/2009 | Walter et al. | |
| 2010/0138863 A1 | 6/2010 | Perez | |

FOREIGN PATENT DOCUMENTS

| | | |
|---|---|---|
| KR | 20010092982 A | 10/2001 |
| KR | 20030079559 A | 10/2003 |
| WO | WO 02/45430 A2 | 6/2006 |

OTHER PUBLICATIONS

Michael Arrington, "Orgoo-The Web Email/IM Replacement", http://www.techcrunch.com/2007/05/14/orgoo-the-web-emailim-replacement/, May 14, 2007, pp. 1-2. Note: The site/service to which the article refers (Orgoo.com) is currently in private beta; the site was last viewed on Oct. 24, 2007.

* cited by examiner

*Primary Examiner* — Joshua Joo
(74) *Attorney, Agent, or Firm* — Hickman Palermo Truong & Becker LLP

(57) ABSTRACT

A method of facilitating the organization and presentation of video e-mails containing embedded video provides a repository for distinguishing video e-mails from regular e-mails, displays the contents of the repository (e.g., as a list of thumbnails, etc.), and, in response to their selection, streams embedded videos from within the e-mail client where the body of an e-mail is usually displayed.

12 Claims, 3 Drawing Sheets

SYSTEM AND METHOD FOR STREAMING VIDEOS INLINE WITH AN E-MAIL

BACKGROUND

1. Field of the Invention

Aspects of the present invention relate generally to a system which allows an e-mail client to stream videos, in real-time, within the client, and to organize these "video e-mails."

2. Description of Related Art

Currently, videos are attached to an e-mail and a program separate from the e-mail client is generally required to play the video. When the user receives an e-mail attachment that contains video, that attachment usually has to be fully downloaded to a local system before it may be viewed. Delays can result from download time, virus scanning, or from any of several other impediments to receiving the attachment. Moreover, such video e-mails are not cataloged in any meaningful way so as to allow searching for a specific video. While a user can sort his e-mail by singling out those with a video attachment (e.g., .avi, .mpg, .flv, etc.), this kind of cataloging does not give an idea of the content of the video, beyond, perhaps, the subject line or text contained in the body of the message.

Thus, it would be desirable to more fully integrate a video viewing/sorting system into a user's e-mail experience.

SUMMARY

In light of the foregoing, it is a general object of the present invention to provide an e-mail system capable of streaming videos within an e-mail client/browser, obviating the need for separate software to play the video.

It is another object of the invention to provide, to e-mails which contain videos, all of the usual searching and sorting capabilities of regular e-mail, in addition to some organizational facilities specific to video e-mails, such as, for example, the ability to view thumbnails of multiple videos.

BRIEF DESCRIPTION OF THE DRAWING FIGURES

DETAILED DESCRIPTION

Figure 1:
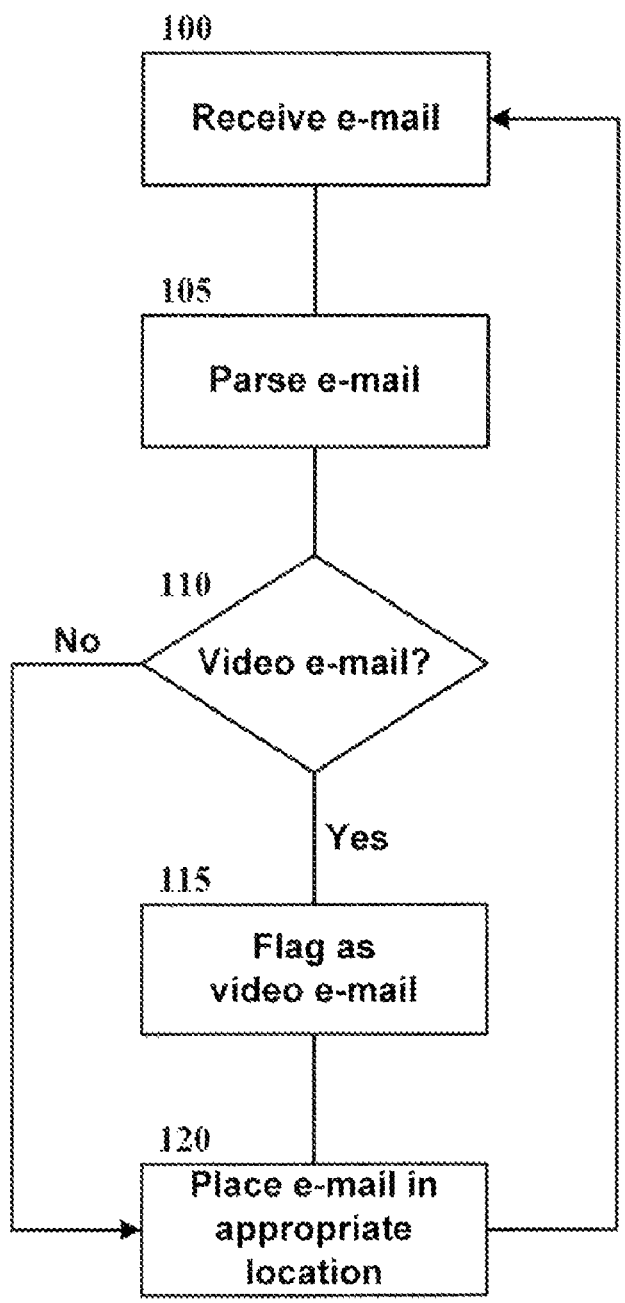
FIG. 1 is a flowchart illustrating a process that may be used to determine whether an e-mail contains an embedded video.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of providing a way to view/sort video inline with e-mail.

As used herein, the phrase "webmail provider" denotes the provider of a webmail service (e.g., Yahoo! Mail, etc.). As is known, such a service generally allows access to e-mail from any computer connected to the Internet. This is possible because all of the e-mail is permanently hosted on a server [owned by the webmail provider] where the user interacts with it [usually] through a web browser; thus, the user does not necessarily "download" his e-mail to a local machine through a local mail client—the e-mail can remain on the server even after viewing.

As used herein, the term "webmail client" is used to denote that 'application' running within a web browser that interfaces with a server-side webmail system. Such an application will likely consist of some combination of HTML, cascading style sheets (CSS), asynchronous JavaScript and XML, etc., but is by no means limited to such an implementation (e.g., one may be inclined to build an interface entirely in Flash®, etc.).

As used herein, the term "video e-mail" is used to denote an e-mail which does not contain an actual video attachment, but rather references a video from within the body of the e-mail.

Throughout this disclosure, a webmail client/provider is used to exemplify the invention, however, the abilities described herein may be just as easily given to a desktop e-mail application (so long as it is capable of handling basic HTML tags).

Presently, regardless of whether one is using a webmail provider or still interacting with his e-mail locally, there is no simple way to receive video through e-mail. Moreover, even where a video is attached to an e-mail, there are no sorting options for video e-mails in particular.

The present invention gets around these limitations by essentially making the video a part of the e-mail and expanding the user's ability to sort such "video e-mail." By taking advantage of webmail provider support for HTML-based e-mails (as opposed to plain ASCII text), the message bodies of HTML-based e-mails can contain code allowing embedding of videos in the body of the message, where such code is readable by the web browser used to access the webmail account.

In one embodiment, such embedding may be done using an "embed" HTML tag, which can be used to add multimedia content to a web page (e.g., most video hosting services, such as, for example, Yahoo! Video, currently allow embedding of videos into a web page that is completely unrelated to the video hosting service). In another embodiment, an "object" HTML tag may be used. While the OBJECT and EMBED elements each have distinct parameters, they ultimately provide the ability to embed video within an HTML document.

In one embodiment, such code may correspond to videos stored at a video hosting service. In another embodiment, such code may correspond to videos stored within the webmail system itself, just as any other attachment would currently be stored.

By obviating the need to download the video, the video can be viewed more quickly. Most video formats, on most operating systems, require the file to be complete before the video can begin to play; however, by using this system, video viewing can begin as fast as the server link will allow, as the videos are being streamed in real-time.

Moreover, because there is nothing for the user to download, there is no concern with large video files taking up local storage space. Further, there is no worry about viruses or other malicious code because the videos do not actually "run" on the user's own machine.

Further, consolidating the experience of watching video e-mails with reading regular e-mails saves time, as the user does not have to switch back and forth between applications, but can instead treat all of the e-mails the same way.

Still further, the user can review a list of video e-mails in context through the use of thumbnails, and may sort them as desired, as discussed below.

FIG. 1 outlines a process by which a webmail provider may determine if a received e-mail contains an embedded video, and if so, how to handle it. At block 100, the webmail provider receives an e-mail sent to the user's e-mail address. At block 105, the webmail provider parses the e-mail to determine whether it contains an embedded video. Using a variety of methods, two of which are described below, the webmail provider can tell when such an embedded video has been received.

In one embodiment, the webmail provider used to send the original video e-mail may be the same as the webmail provider used to receive it; in that case the webmail provider may use a previously agreed-upon system to note which e-mails were in fact video e-mails. For example, a pre-defined flag may be set to indicate that the e-mail contains an embedded video, and thus should be treated as such by the webmail provider and the user's webmail client. In one implementation, the webmail provider could place such a flag in a section of the e-mail. For example, the flag may simply be a sequence of numbers inserted into the HTML body of the e-mail, yet hidden from the user using CSS, etc. As another example, the e-mail could contain a small attachment with a code specifying that it is a video e-mail. In still another example, the webmail provider may note, on the backend (i.e., through a database it uses to store the e-mails, etc.) that a particular e-mail contains an embedded video.

In another embodiment, such video e-mail information may be made accessible to any webmail client (i.e., irrespective of whether the e-mail was generated and received through the same webmail provider), by using functionality built into known e-mail standards. For example, RFC 1341, "MIME (Multipurpose Internet Mail Extensions): Mechanisms for Specifying and Describing the Format of Internet Message Bodies," defines an optional header field called "Content-description," which may be used to describe the type of information an e-mail contains, such as, for example, embedded video. A webmail provider may scan the header of the e-mail looking for a particular phrase attached to the Content-description field, and then act accordingly (i.e., treat the e-mail as a video e-mail if such a phrase is found).

If, at block 110, the e-mail is determined to be a video e-mail, the webmail provider flags it as such at block 115. After such determination is made, the video e-mail is placed in the appropriate folder at block 120.

Regardless of the method used to set a video e-mail apart from the other e-mails (i.e., those without the video e-mail information), the e-mail itself remains a "regular" e-mail and may live in the user's "inbox," as all other messages do. Accordingly, the user may manipulate the message as he/she could any other message (e.g., reply, forward, move to a different folder, apply a keyword/tag, etc.), as shown by e-mail actions 305 in FIG. 3.

In addition to being treated as a regular e-mail, a video e-mail may have its own set of features and manipulatory tools. For example, the video e-mail may be automatically copied, given a specific keyword/tag, or moved into its own folder—a folder for e-mails with embedded video. Such a folder may serve as a repository for all video e-mails and allow the user to further search for and categorize the e-mails within it. The particular implementation of the folder structure is not critical to the invention. For example, depending on the webmail provider being used, a "videos" folder may be either an actual folder (i.e., the message, or a copy of the message if it is in multiple folders, actually persists inside of that folder) or a "virtual" or "smart" folder, where the webmail provider simply associates a tag or keyword with an e-mail and then creates a container to list all e-mails so tagged; the point is that the video e-mails are set off from the regular e-mails.

Figure 2:
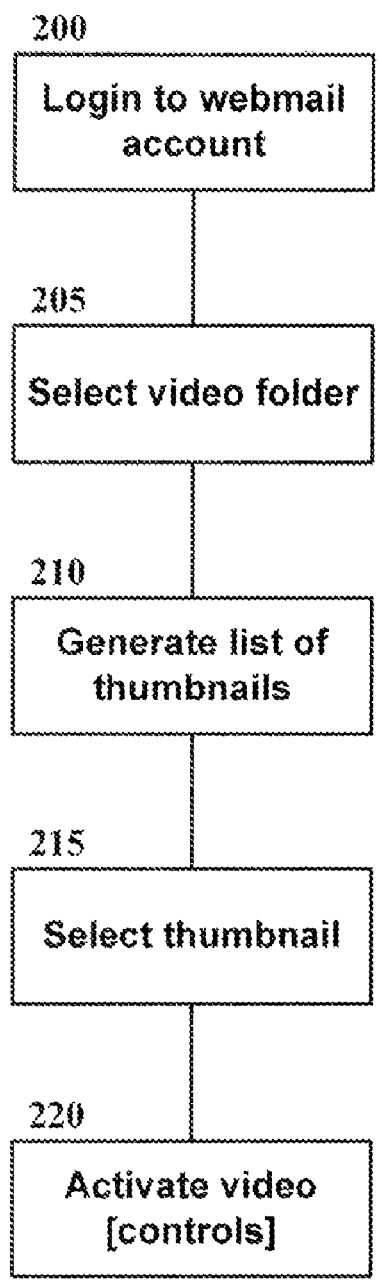
FIG. 2 is a flowchart illustrating how a user may interact with a webmail client that supports video e-mails.
Figure 3:
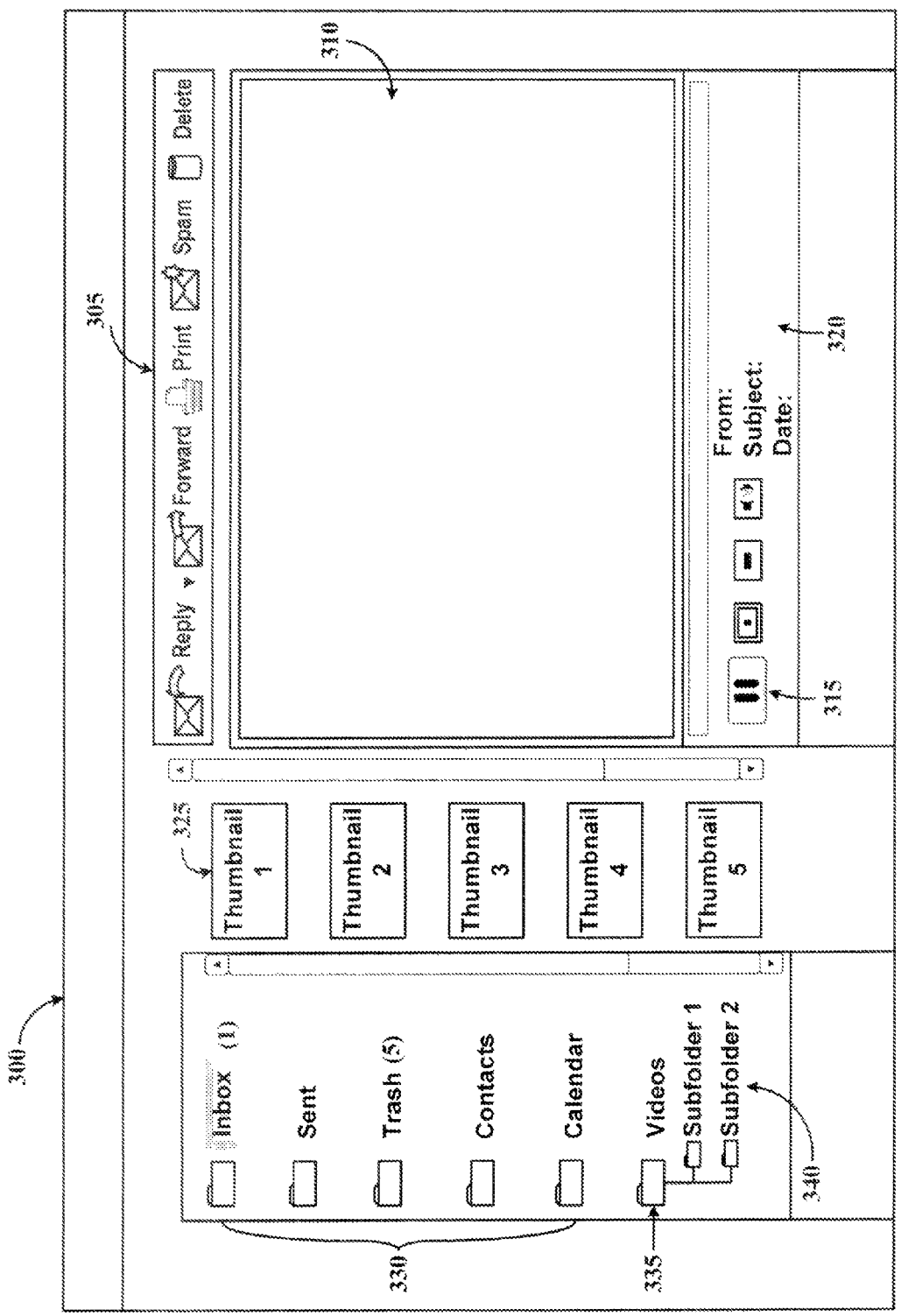
FIG. 3 is an example of a video e-mail interface.

After a video e-mail has been received and acknowledged as such by the webmail provider, the e-mail can be presented to the user upon login to the webmail account. FIG. 2 illustrates the process by which a user may view and interact with a video e-mail; FIG. 3 is an example of the appearance that a webmail provider, capable of displaying video e-mails, may appear. FIG. 3 is referenced throughout the discussion of FIG. 2.

At block 200, the user logs into his webmail account through his web browser, where he may be presented with a page that looks similar to webmail page 300. At block 205, the user chooses the "video" folder 335. Choosing this folder may cause thumbnails 325 to be generated at block 210. Such thumbnails can take several different forms. For example, the thumbnails may simply be the last few video e-mails received, shown in reverse chronological order. As another example, the thumbnails may correspond to all video e-mails sent by the person whose e-mail the user currently has highlighted. It will be appreciated that such criteria, as with the sorting/organization of regular e-mail, may be anything that can be ranked, made hierarchical, etc.

Thumbnails may be generated at different times. For example, thumbnails can be created when the video is initially inserted, using a webmail provider, into a to-be-sent video e-mail. In this case, the webmail provider might store the thumbnails on the backend so that they need not be generated each time the videos to which they correspond are accessed (e.g., when the user chooses the video e-mail folder 335). In another embodiment, the thumbnails may be generated, for the first time, when the user actually receives the video e-mail. As with the particular implementation of the backend folder structure, the way in which thumbnails are generated and/or stored is not critical.

Further to the organizational end, video folder 335 may contain subfolders 340, so that the video e-mails, containing an embedded video, can be sorted and manipulated as any other e-mail may be. For example, a subfolder 340 may be used to store all video e-mails sent from a particular person, all video e-mails received during a defined time period, all video e-mails with a particular word in the subject line, etc.

At block 215, using the contextual information provided by the thumbnails, the user chooses a video to watch by clicking on the thumbnail. In one embodiment, when the user hovers over a particular thumbnail, a short preview of the video may play, or some further information about the video may be displayed (e.g., length, size, etc.). When the thumbnail is clicked on, the embedding mechanism is invoked and the resulting data (e.g., the actual streaming video, the video controls 315, etc.) is presented to the user at block 220, as shown by video box 310. Video controls 315 are available to the user just as they are on other web pages that contain embedded video. In addition to the video controls 315, other e-mail information 320 may be displayed, such as, for example, sender name, date, subject, etc.

It will be appreciated that video controls 315 may be part of the video itself, and need not be particular to the webmail provider. In one embodiment, the embedded video itself defines the controls and presents them together with the video as a single package. Once this package is presented to the user, he may then interact with the video. For example, the user may choose to "play" the video, or turn the volume up or down, etc. As discussed, and as is the case with other web pages with embedded video, when the user chooses to play the video, it is streamed to the user as fast as his connection can carry it, thereby removing the need to wait for the video to download—the viewing experience can begin almost immediately. Moreover, the user is not saddled with a large download residing on his system, nor must he wait for the entire video to finish downloading before he can view it.

The sequence and numbering of blocks depicted in FIG. 2 is not intended to imply an order of operations to the exclusion of other possibilities. Those of skill in the art will appreciate that the foregoing systems and methods are susceptible of various modifications and alterations. For example, block 210, as illustrated in FIG. 2, may generate, along with the thumbnails, a textual list, as is common with most current e-mail clients.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
    receiving a plurality of emails for a particular user of an email client;
    determining, by a webmail provider, that the plurality of emails includes a set of video emails, each video email of the set referencing a video from within a body of the video email without containing a video attachment;
    receiving a first user-interaction from the particular user to login to an email account of the particular user;
    in response to the first user-interaction to login to the email account of the particular user, causing the email client to display at least two folders;
    wherein a first folder of the at least two folders is an inbox that includes one or more of the plurality of emails for the particular user;
    wherein a second folder of the at least two folders is a video folder that includes the set of video emails;
    wherein each video email of the set is placed by the webmail provider in the video folder;
    receiving a second user-interaction selecting the video folder displayed by the email client;
    in response to a second user-interaction selecting the video folder, causing the email client to display a list of thumbnail images, each thumbnail image of the list corresponding to a video referenced by a different video email in the set of video emails;
    receiving a third user-interaction, from the particular user of the email client, selecting a particular thumbnail image from the list of thumbnail images;
    in response to the third user-interaction, initiating playback, of a particular video referenced by a particular video email of the set that corresponds to the particular thumbnail image, to the user;
    wherein the third user-interaction causes the particular video to be displayed within the email client without launching an application separate from the email client;
    wherein the third user-interaction causes the particular video to be displayed by streaming the particular video for playback within an area of the email client where a body of an email is usually displayed;
    wherein the method is performed by one or more computing devices.

2. The method of claim 1, further comprising:
    receiving a fourth user-interaction hovering over the particular thumbnail image;
    in response to the fourth user-interaction, causing display of statistics about the particular video without initiating playback of the particular video;
    wherein the statistics about the particular video include information about a size of the particular video.

3. The method of claim 1, further comprising receiving a fourth user-interaction that embeds a video in a to-be-sent email, wherein a thumbnail image of the video is generated automatically in response to the third user-interaction before the to-be-sent email is sent.

4. The method of claim 1, wherein a body of the particular video email references the particular video through one or more HyperText Markup Language (HTML) tags that allow the particular video to be played by the email client without the email client, or a webmail server hosting the particular email, having to store a video file.

5. The method of claim 4, wherein the one or more HTML tags are one of an "embed" HTML tag or an "object" HTML tag.

6. The method of claim 1, wherein a particular video email that references the particular video is received at a webmail server, and the particular video is hosted externally from said webmail server.

7. A non-transitory computer-readable storage medium storing one or more sequences of instructions which, when executed by one or more processors, causes the one or more processors to perform the method recited in claim 1.

8. A non-transitory computer-readable storage medium storing one or more sequences of instructions which, when executed by one or more processors, causes the one or more processors to perform the method recited in claim 2.

9. A non-transitory computer-readable storage medium storing one or more sequences of instructions which, when executed by one or more processors, causes the one or more processors to perform the method recited in claim 3.

10. A non-transitory computer-readable storage medium storing one or more sequences of instructions which, when executed by one or more processors, causes the one or more processors to perform the method recited in claim 4.

11. A non-transitory computer-readable storage medium storing one or more sequences of instructions which, when executed by one or more processors, causes the one or more processors to perform the method recited in claim 5.

12. A non-transitory computer-readable storage medium storing one or more sequences of instructions which, when executed by one or more processors, causes the one or more processors to perform the method recited in claim 6.

* * * * *